United States Patent [19]

Masters

[11] 3,777,354
[45] Dec. 11, 1973

[54] PORTABLE HOSE MENDING APPARATUS

[75] Inventor: Philip C. Masters, Ashland, Ohio

[73] Assignee: McNeil Corporation, Akron, Ohio

[22] Filed: Feb. 25, 1972

[21] Appl. No.: 229,412

[52] U.S. Cl.................... 29/237, 29/256, 29/401, 29/508, 29/520, 72/416, 72/454, 72/470
[51] Int. Cl............................................ B23p 19/04
[58] Field of Search.................. 29/508, 520, 237, 29/401, 256, 525; 72/412, 416, 454, 470

[56] References Cited
UNITED STATES PATENTS

| | | | |
|---|---|---|---|
| 3,019,520 | 2/1962 | Wooley | 29/520 X |
| 3,325,885 | 6/1967 | Ziegler et al. | 29/256 X |
| 3,474,519 | 10/1969 | Hallesy | 29/525 X |
| 3,579,794 | 5/1971 | Powell | 29/237 |

*Primary Examiner*—Charlie T. Moon
*Attorney*—Hamilton, Renner & Kenner

[57] ABSTRACT

Disclosed is apparatus for mending breaks or tears in hoses, particularly high pressure hoses such as utilized in sewer cleaning operations. Two die holding plates receive half of a split swaging die in a generally U-shaped slot therein. The two parts of the hose to be mended are put into a coupler and then placed on the dies within the slot of the plates. The other half of each die is placed on the hose and the dies can be locked in place. The die holding plates are attached to each other by opposed draw bolts which when simultaneously tightened will cause the dies to pass over the coupler and swage the same onto the hose. The apparatus can also be readily adapted to affix end fittings to hoses, if desired.

6 Claims, 7 Drawing Figures

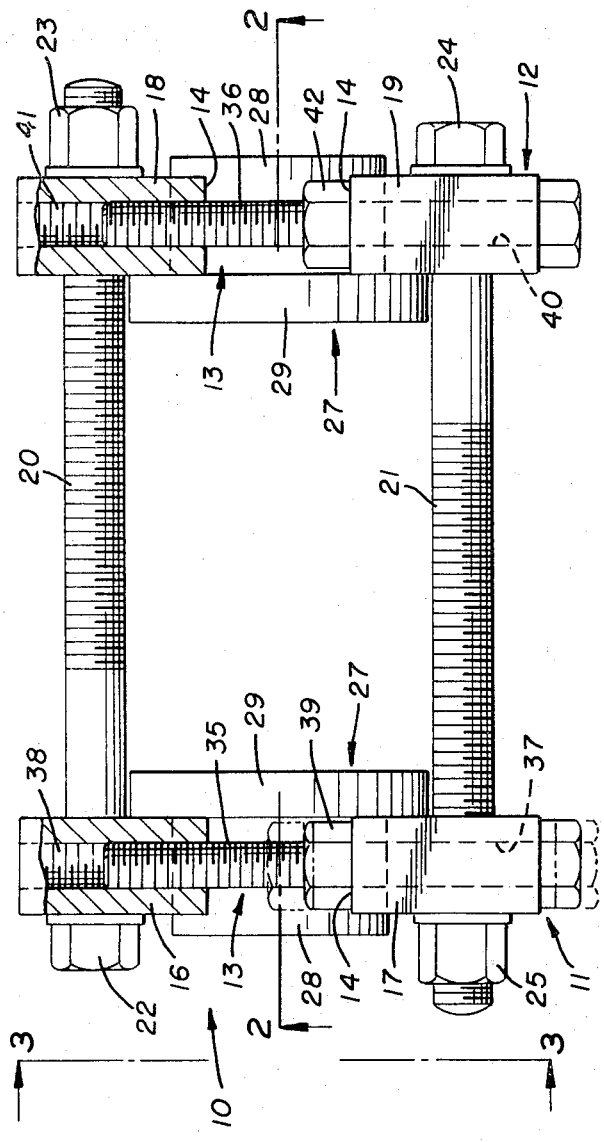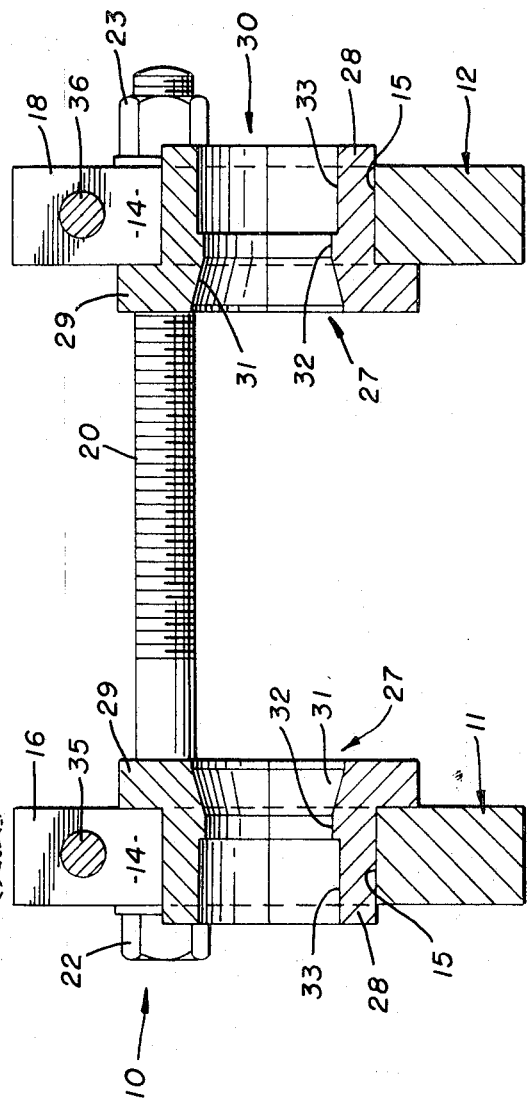
FIG. 1
FIG. 2

PORTABLE HOSE MENDING APPARATUS

BACKGROUND OF THE INVENTION

This invention relates for the most part to an apparatus for mending a damaged hose, particularly a high pressure hose such as used to clean sewers and the like. More particularly, this invention relates to a device which can easily swage hardware such as a coupler over defective hose parts by a method which can be performed in the field, that is, at the site of operation where the defect in the hose might occur.

There are many devices or methods known in the prior art for attaching end fittings onto a hose. Similarly, there are some, but not as many, devices or methods for mending a damaged hose. While mending a hose involves a different operation than providing a hose with an end fitting, the two operations are somewhat similar and it is often desirable to be able to do both in the field as well as in the shop.

When it is necessary to attach a new end fitting to a hydraulic hose in the factory or shop, there are a number of machines which, usually hydraulically or electrically, fasten the end fitting to the hose in a substantially permanent manner. While the manufacturers of these machines claim they are usable in the field, such is not the case. Usually the size, weight or power requirements of these machines make their field use unacceptable. Further, the cost of these machines makes low volume operations impractical.

When one is faced with mending a hose at some point along its length, the problems are even more complex. First, every prior art device of which I am aware requires that the hose be threaded and/or unthreaded into and out of the machine. When the area to be mended is near the midpoint of a hose, as used for example in sewer cleaning applications, which can be 400 feet long or longer, threading or unthreading becomes a significant consideration.

If the mending is being done in the shop, there are crimping machines available which allow one to satisfactorily couple two hose halves together. However, in the field the mending of a damaged hose is most often accomplished by a series of bands tightened around a hose after an inner hollow core is placed in the hose at the area of the break. This method has, however, proved highly unsatisfactory for numerous reasons. For example, it would only be coincidental if the plurality of bands were all tightened to the same degree. If, as is almost always the case, one band is tighter than the rest, the holding force is thus extremely localized and the bond is very short-lived since the inner core at that one location is carrying the entire tensile load on the hose. Further, the exterior bands often act as obstructions to the facile use of a hose. Not only do such bands tend to catch as the hose is being utilized but also they present difficulties in the convenient coiling and storing of the hose. Finally, these bands, as is the case with all currently available field repair devices, do not provide a bond of adequate strength when working with high pressure hoses.

In fact, the prior art is totally deficient in the area of a hose mending device which provides a permanent and nonobstructive repair to the high pressure hose by a method which can be readily accomplished in the field as well as in the factory.

SUMMARY OF THE INVENTION

It is thus a primary object of the present invention to provide a hose mending device which can repair damaged hoses by a method readily accomplished in the field or in the shop.

It is another object of the present invention to provide a hose mending device, as above, which does not require a threading or unthreading of the hose to be repaired.

It is still another object of the present invention to provide a hose mending device, as above, which will afford a permanent mend to the hose without creating external obstructions thereon.

It is yet another object of the present invention to provide a hose mending device, as above, which requires no external power to be operated.

It is a further object of the present invention to provide a hose mending device, as above, which is also capable of attaching end fittings to a hose.

It is a still further object of the present invention to provide a hose mending device, as above, which can produce a sturdy bond in high pressure hoses of a variety of sizes.

These and other objects of the present invention which will become apparent from the following description are accomplished by means hereinafter described and claimed.

In general, two die holding plates are provided with upwardly extending U-shaped or key-hole shaped slots for receiving the lower halves of identical split tapered dies. The plates are maintained in a vertical and generally parallel relationship by longitudinally extending draw bolts located therebetween. After the hose is spliced at the point of its damage, each end is attached to a coupler and the hose lowered onto the lower die halves. The mating die halves are then placed over the hose and the dies can be locked in place by cross bolts which span the slot opening in each plate. With the dies thus locked in place, the draw bolts are tightened to swage the dies over the coupler and affix the same to the hose in a uniform manner. The repaired hose is easily removed by disengaging the cross bolts to unlock the dies.

A preferred embodiment of the present invention is shown by way of example in the accompanying drawings and is hereinafter described in detail without attempting to show all of the various forms and modifications in which the invention might be embodied; the invention being measured by the appended claims and not by the details of the specification.

BRIEF DESCRIPTION OF THE DRAWINGS

FIG. 1 is a top plan view of the device for mending hoses according to the concept of the present invention.

FIG. 2 is a sectional view taken substantially along line 2—2 of FIG. 1.

DESCRIPTION OF THE PREFERRED EMBODIMENT

Figure 3:
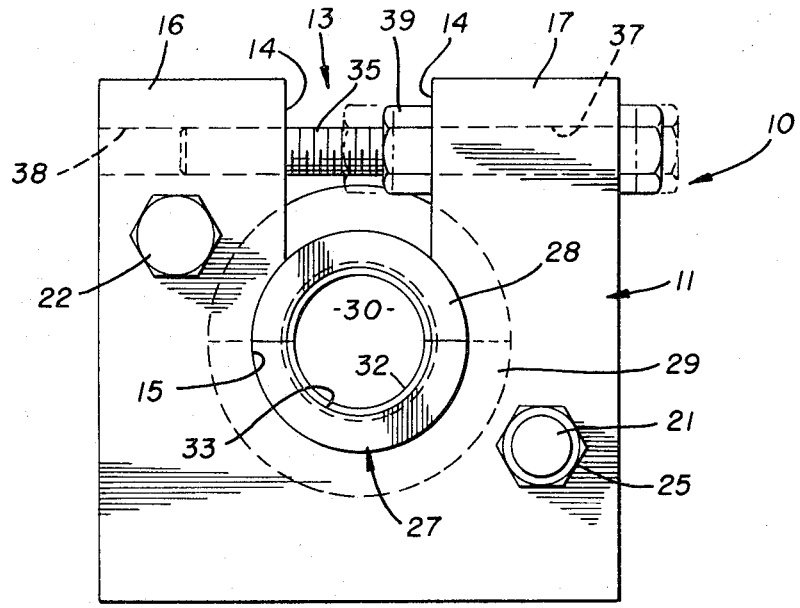
FIG. 3 is an end view taken substantially along line 3—3 of FIG. 1.

The portable hose mending device according to the concepts of the present invention is indicated generally by the numeral 10 in FIGS. 1–3 of the drawings and consists, in part, of two die-holding plates 11 and 12 each having a U-shaped or keyhole shaped slot 13 therein. As best shown in FIG. 3, each slot 13 includes two generally vertical surfaces 14 and an arcuate or somewhat circular die receiving surface 15. The surfaces 14 are defined by upwardly extending branches 16 and 17 of plate 11 and branches 18 and 19 of plate 12, respectively.

Extending longitudinally between plates 11 and 12 are two draw bolts 20 and 21 positioned, in the preferred embodiment, at generally diametrically opposed corners of plates 11 and 12. Thus, draw bolt 20 having a head 22, is slidably received through a bore in branch 16 of plate 11 and engages a threaded bore in branch 18 of plate 12, being held thereto by a nut 23. Similarly, draw bolt 21, having a head 24, is slidably received through a bore in the base portion of plate 12 and engages a threaded bore in the base portion of plate 11, being held thereto by a nut 25.

The lower portion of each arcuate surface 15 of each slot 13 in plates 11 and 12 is adapted to receive the lower half of a split die 27. The dies 27, taken each as a whole, have a barrel-like portion 28 which fits within the confines of surface 15 of plates 11 and 12, and a flange portion 29 of larger diameter than barrel portion 28 which rests against the inside of plates 11 and 12. Extending axially through each die 27 is a bore 30 which is inwardly tapered as at 31 to a point of minimum diameter as defined by the generally parallel walls 32. The remainder of bore 30, totally within barrel portion 28, is designated by the numeral 33 and is of a diameter slightly larger than the hose which is being repaired. In this regard, it is evident that numerous sized dies could be utilized in conjunction with one set of plates 11 and 12 with the only limiting feature being the diameter of the arcuate surface 15 within plates 11 and 12.

In order to maintain the dies 27 locked within surface 15 of slot 13, two cross bolts 35 and 36 are provided. Bolts 35 and 36 extend laterally or transversely across plates 11 and 12, respectively, and span the slots 13. Thus bolt 35 is slidably received through transverse bore 37 of branch 17 of plate 11 and is tightened into the threaded bore 38 of branch 16. A lock nut 39 can be utilized, if necessary, to hold bolt 35 in place once tightened. Similarly, bolt 36 is slidably received through transverse bore 40 of branch 19 of plate 12 and is tightened into the threaded bore 41 of branch 18. A lock nut 42 can be utilized, if necessary, to hold bolt 36 in place once tightened. As will hereinafter become evident, nuts 39 and 42 can also be used to spread branches 16 and 17 and 18 and 19, respectively, to release the dies after use.

Figure 4:
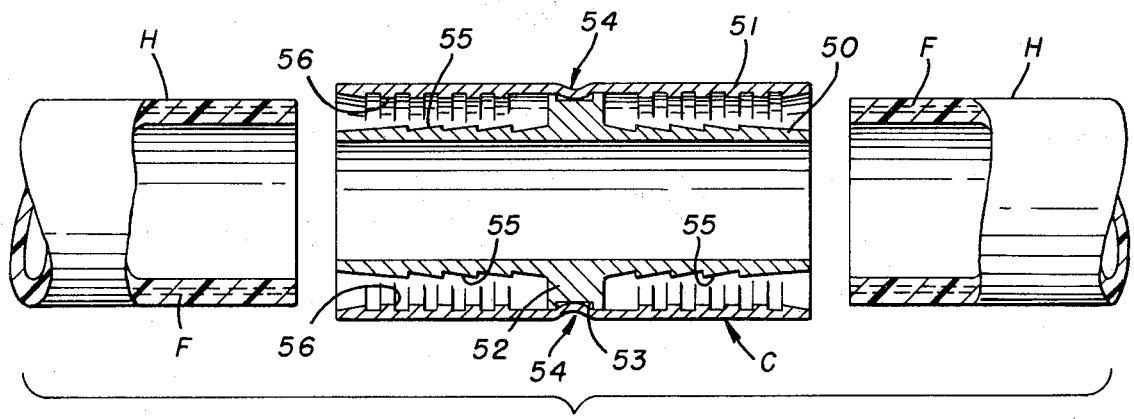
FIG. 4 is a view of a coupler which can be utilized with the device shown in FIGS. 1-3, inclusive, the coupler being shown with two hose parts to be mended.

A conventional coupler C, which serves to mend or attach two hose halves H, is best shown in FIG. 4. Coupler C consists generally of an inner tubular member or bore 50 and an outer swagable tube 51. Core 50 is maintained spaced from tube 51 by a radially extending ring member 52 which is shown as being part of core 50. The ring 52 has a circumferential groove or recess 53 therein so that when the tube 51 is placed thereon and dimpled, as at 54, the core 50 and tube 51 will maintain their axial alignment.

The internal surface of core 50 is, of course, smooth to permit the eventual unobstructed flow through the mended hose H. The external surface of core 50 includes a plurality of saw tooth serrations 55 which, as will hereinafter become evident, grip the internal portion of the hose H. Similarly, the internal surface of the tube 51 of coupler C is characterized by a series of crenelations 56 which grip the external surface of hose H. As is somewhat schematically shown by the dotted line F, the hose H is a fiberous reinforced plastic hose such as would be used for high pressure operations.

When, in the shop or in the field, a hose is damaged and needs repair, the hose must first be spliced into two sections as shown in FIG. 4. Each end of the hose H is then guided into the space between core 50 and tube 51 preferably until abuttment with ring 52 is accomplished.

With the plates 11 and 12 spaced generally at the extremeties of draw bolts 20 and 21, and with cross bolts 35 and 36 removed, the proper sized dies 27 are selected and the lower halves thereof placed at the bottom of slots 13 on arcuate surface 15. The hose H can then be lowered down slots 13 directly into the die halves with the coupler C extending longitudinally between the plates 11 and 12. No threading of the hose is thereby necessary. With the hose H thus positioned, the upper die halves are placed over the hose and the cross bolts 35 and 36 tightened to lock the dies 27 in place. Nuts 39 and 42 can also be tightened, if necessary, to maintain the position of bolts 35 and 36.

Figure 5:
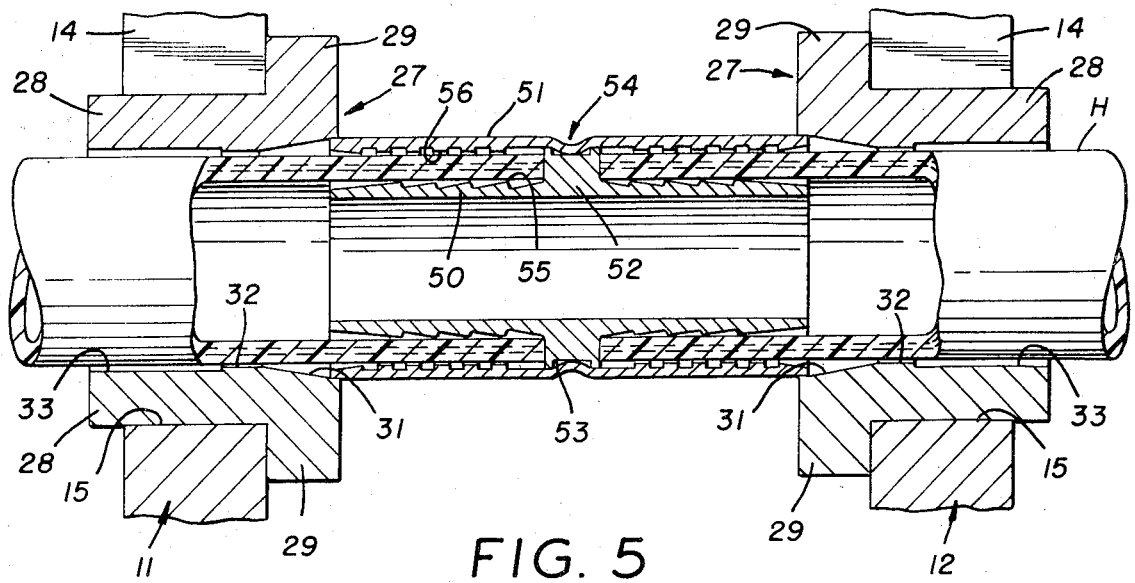
FIG. 5 shows a broken-away sectional portion of the device for mending hoses in operation just as the coupler is about to be swaged onto the hose.
Figure 6:
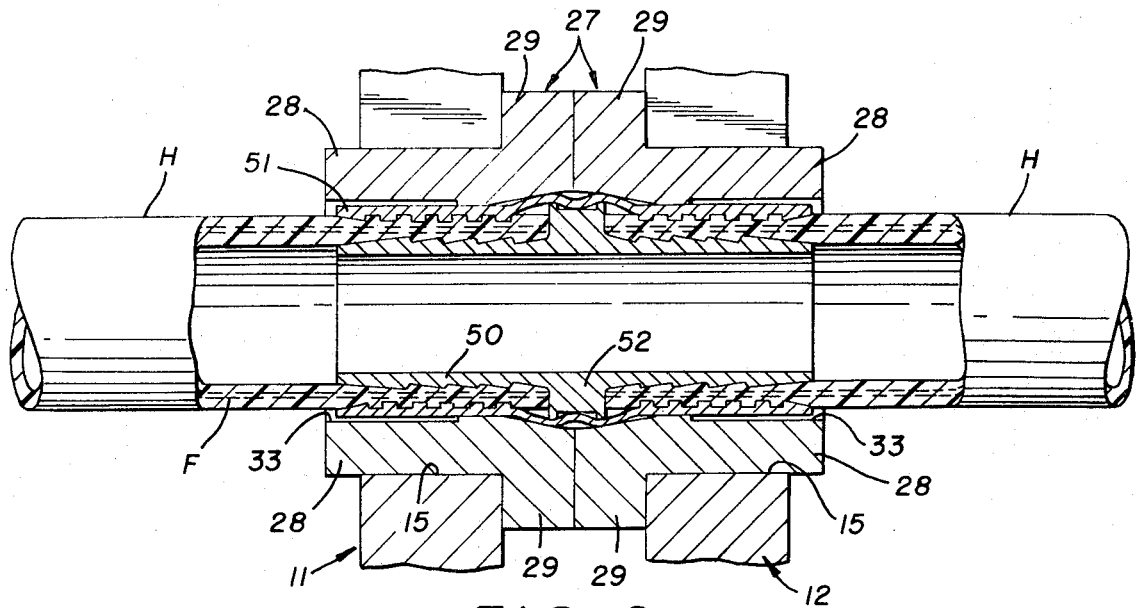
FIG. 6 is a sectional view sequentially following FIG. 5 in the operation of the device according of the present invention and shows the coupler completely swaged onto the hose.

The coupler C is now swaged to the hose H by a simultaneous tightening of nuts 23 and 24 which, of course, causes the plates 11 and 12 to be pulled together by the draw bolts 20 and 21. The diametric position of bolts 20 and 21 permits an even swaging force to be transmitted to the coupler. FIG. 5 shows the condition of the apparatus and coupler near the beginning of the swaging process with the coupler C just entering the tapered portions 31 of dies 27. FIG. 6 shows the dies fully closed over the coupler with the swaging completed with the majority of the coupler being reduced to the minimum diameter 32 of dies 27. At any point during the swaging process, and most often at the beginning, it may be desirable to lubricate the points of contact between the dies and the coupler to ease the swaging process.

Figure 7:
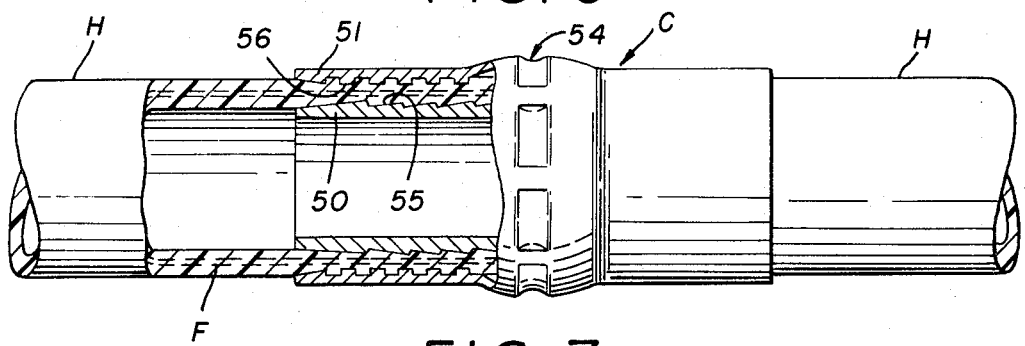
FIG. 7 is a partially sectioned view of the coupled hose, the finished product made by apparatus of the present invention.

In order to remove the hose from the dies, the process is generally reversed. The draw bolts 20 and 21 are loosened and the cross bolts 35 and 36 unlocked. In order to assure that the dies are removable from the plates, with the nuts 39 and 42 in the dotted line position of FIGS. 1 and 3, the bolts 35 and 36 are turned back to the dotted line position in these FIGS. Then a subsequent tightening of nuts 39 and 42 spreads branches 16 and 17 of plate 11 and 18 and 19 of plate 12, respectively, to unlock the dies by relieving the pressure thereon. The plates 11 and 12 can then be separated with the dies 27 generally adhering to the coupler. The dies can then be tapped off the hose and with the cross bolts 35 and 36 fully removed, the hose can be lifted upwardly through slot 13 and directly out of the mending device 10. The finished product is shown in FIG. 7.

Having now described the method for mending a hose in the apparatus 10, it should be evident that the same apparatus could be utilized to swage other hardware such as an end fitting onto a hose. In such a case, the fitting is placed on the end of the hose and only one die 27 utilized. The fitting is placed in an anvil designed to match the particular fitting and the anvil then positioned in the slot 13 of the plate which does not have a die. Then the tightening of the draw bolts swages the one die over the end fitting in a fashion as described hereinabove.

A device constructed according to the present invention, as described above, will allow one to perform the hose mending method taught herein in the field as well as the shop, being light weight and not dependent on external power sources. Further, the coupler, once applied, does not interfere with hose operation and provides a strong bond capable of withstanding the high pressures prevalent in many applications; thus carrying out the aforementioned objectives and substantially improving the hose mending art.

I claim:

1. Apparatus for swaging hardware onto a hose comprising, two die holding plates each having a slot therein and being relatively movable toward and away from each other, at least one die received within the slot of at least one of said die holding plates, and means to space said die holding plates so that the hose and hardware can extend longitudinally therebetween and to draw said die holding plates together so that the hardware is swaged onto the hose, said means including two draw bolts extending longitudinally between said die holding plates and laterally of said slot, one of said draw bolts being slidable through the first of said die holding plates and threadably engaging the second of said die holding plates, the other of said draw bolts being slidable through the second of said die holding plates and threadably engaging the first of said die holding plates so that simultaneous movement of said draw bolts evenly moves said die holding plates toward and away from each other.

2. Apparatus according to claim 1 wherein the hardware is a coupler for mending two hose parts, there being two said dies one each received within the slot of said die holding plates, each hose part being placed within a die with the coupler therebetween, the coupler being swaged to the hose parts by said dies.

3. Apparatus according to claim 2 wherein each said die is longitudinally split to receive the hose halves.

4. Apparatus according to claim 2 further comprising means to hold said dies within the slots of said die holding plates.

5. Apparatus for swaging a coupler onto two hose parts for mending the same comprising, two die holding plates each having a slot therein, a die received in each slot of said die holding plates, each hose part being placed within a die with the coupler therebetween, a bolt extending laterally across the slots in said die holding plates to hold each said die within the slots of said die holding plates, and means to space said die holding plates so that the hose and coupler can extend longitudinally therebetween and to draw said die holding plates together so that the coupler is swaged to the hose parts by said dies.

6. Apparatus according to claim 5 further comprising means on each said bolt to lock said bolt to prevent movement thereof and to unlock said dies from said slots.

* * * * *